Patented Mar. 13, 1923.

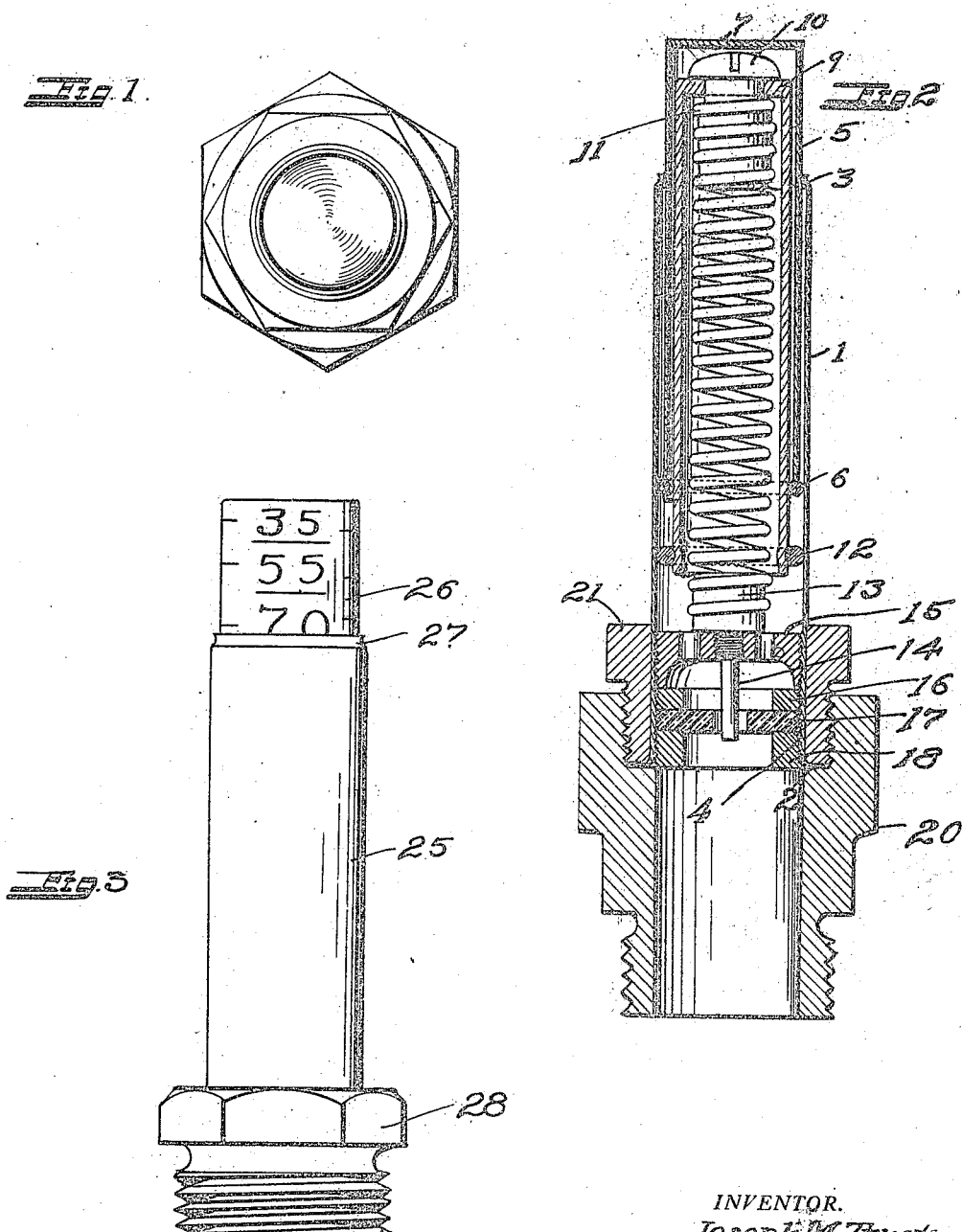

1,448,168

UNITED STATES PATENT OFFICE.

JOSEPH M. TRUSTY AND HARRY TRUSTY, OF CORTE MADERA, CALIFORNIA.

TIRE AND ENGINE GAUGE.

Application filed January 31, 1921. Serial No. 441,406.

*To all whom it may concern:*

Be it known that we, JOSEPH M. TRUSTY and HARRY TRUSTY, citizens of the United States, residing at Corte Madera, in the county of Marin, State of California, have invented a new and useful Tire and Engine Gauge, of which the following is a specification in such full and clear terms as will enable those skilled in the art to construct and use the same.

This invention relates to a gauge for determining the pressure carried in pneumatic tires and also for the purpose of determining the compression of the several cylinders of a gas engine.

It will be understood by those skilled in the art that it is frequently necessary to grind the valves of an engine when they have become leaky. This work can only be done by a skilled person, and is usually done by guess, all of the valves being ground whenever they appear to be pitted enough to require it. With the aid of the present invention much unnecessary labor is eliminated and the valves are ground only when it appears that the individual cylinder has lost the compression it should have. It also becomes possible to determine whether the cylinder is leaking from any other than valve trouble, for if the valves are properly ground and the cylinder still leaks, the loss of compression must be traced to some other source.

The gauge has threads outside one end to apply to a spark plug opening and it has a rubber washer to permit it to be used to test the pressure in the tires thereby accomplishing two objects with the single instrument.

Other objects of the invention will appear as the description proceeds.

An embodiment of the invention is shown in the accompanying drawings in which the same reference numeral is applied to the same portion throughout, but I am aware that there may be modifications thereof.

Figure 1 is a plan view of the gauge.

Fig. 2 is a vertical sectional view of the complete gauge as it appears when one form of tire tester is used in combination with the ordinary threaded collar and bushing of a spark plug.

Fig. 3 is a side elevation of a gauge having a single threaded bushing thereon to connect it with the engine.

The pressure testing apparatus proper comprises an open outer cylindrical shell 1 provided with a flange 2 and a crimped portion 3. The shell 1 is provided with internal threads at 4. Slidable within the shell is a cylinder 5 having a gasket 6 at one end and having its other end closed as shown at 7. This cylinder slides snugly in the shell 1 and it is provided with a plurality of numbers to indicate the pressures encountered by the gauge.

Inside the cylinder 5 is a second cylinder 9 closed at one end by a screw 10 to which a long spiral spring 11 is connected. At the other end of the cylinder 9 there is a gasket 12 arranged to produce an air tight joint with the outer shell 1. The end of the spring 11 at the open end of the cylinder 9 is connected to a stud 13 which has a pin 14 for depressing the valve stem of a tire tube. The stud 13 is connected to an exteriorly threaded washer 15 which has openings therein. Secured against the washer or ring 15 is a flat threaded washer 16 which forms a foundation for a gum rubber gasket 17 the latter being held in place by the threaded washer or ring 18. The rubber gasket 17 is used for the purpose of testing the pressure in tires. The tension on the spring 11 may be regulated by turning the threaded pin 14.

In order to permit the gauge to be used for testing the engine pressures the gauge is secured to the bushing 20, which has threads to correspond with the threads of the spark plug openings of the engine, by means of the threaded bushing 21 which bears on and makes an air tight joint with the flange 2.

If made up specially for the purposes herein outlined the gauge may be made so as to dispense with the bushing 20 shown in Fig. 2. In this form of the invention the gauge is precisely the same as in the other form of the invention, the outer shell being shown at 25 and the numbered indicator cylinder at 26 the cylinder 25 being crimped in at 27 to hold the indicator cylinder in place. Pressed tightly over the shell 25 is a bushing 28 which is threaded to fit any opening into the engine cylinder.

In operation the gauge is pushed down over the end of a tire stem whereupon the indicator shell is raised to a height to correspond with the pressure applied thereto. The crimps 3 and 27 prevent the shells 5 and 26 from being forced out of their containers. If the gauge is to be applied to an engine the spark plug is removed from one of the cylinders and this gauge is inserted therein. The crank shaft is then turned over by hand and the amount of compression will be at once indicated. Tests on the other cylinders will at once show whether they need attention or not.

What we claim is as follows, but various modifications may be made in the construction shown in the drawings and above particularly described form, within the purview of our invention:

A pressure tester comprising an exteriorly threaded bushing, a tubular shell applied thereto, a tube slidable within the shell, a spring for holding the tube down and for measuring the pressure required to raise the tube, a disk in the shell, a threaded pin for adjustably connecting the spring to the disk and for opening the tire valve, and means to indicate the pressure applied within the shell.

In testimony whereof we have hereunto set our hands this 27th day of Dec., A. D. 1920.

JOSEPH M. TRUSTY.
HARRY TRUSTY.